United States Patent Office 3,039,324
Patented June 19, 1962

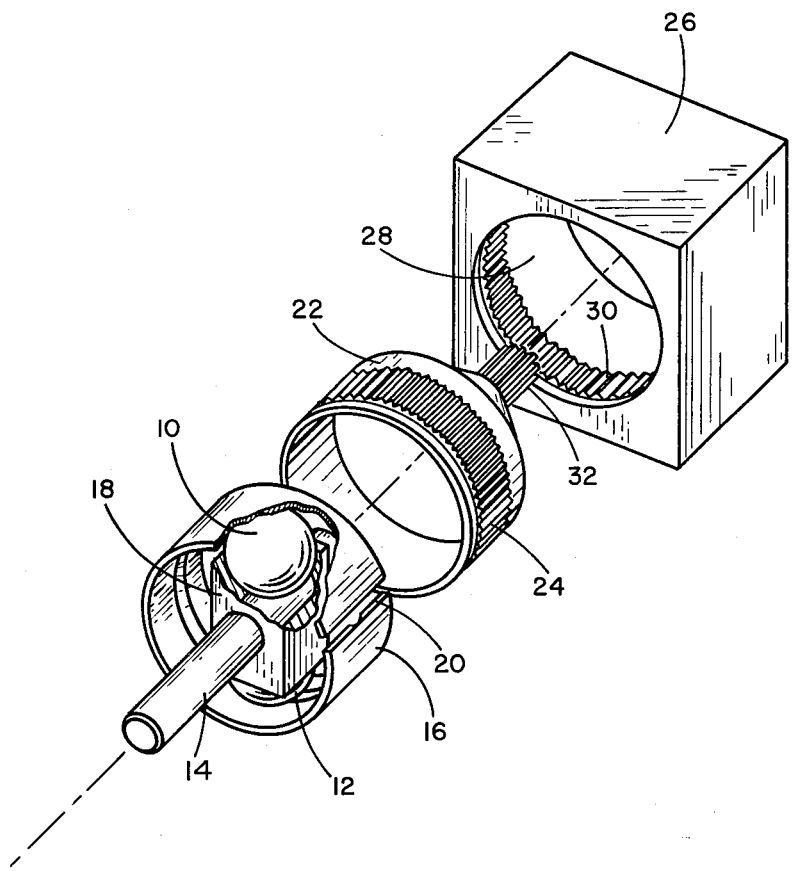

3,039,324
SPEED REDUCTION DRIVE
Roland A. Waterfield, Grand Rapids, Mich., assignor to Lear, Incorporated
Filed Dec. 14, 1959, Ser. No. 859,476
11 Claims. (Cl. 74—640)

This invention pertains to a speed reduction drive, and more particularly to a speed reduction drive which is extremely compact.

The speed reduction drive of this invention has a rotatable input shaft which carries at least two harmonic wave generators that are adapted to flex a flexible pressure ring to thereby force a first set of teeth on the outer periphery of a flexible cylinder member into consecutive engagement with a second set of teeth on the inner surface of a cylindrical chamber. The number of teeth on the two cylindrical members is slightly different to cause an indexing of the flexible cylindrical member.

When a device of the kind described is utilized in power drives, and the like, the diameter of the flexible pressure ring is usually large. However, when it is desired to reduce the size of the drive of this invention in order to utilize it as an instrument drive, and the like, the flexing of the pressure ring damages it.

I have discovered that the drive of this invention can be utilized in very small sizes without damage to the parts by splitting or fracturing the pressure ring, usually along one of its axial elements.

While it is within the contemplation of this invention that the fracture in the spit pressure ring need not necessarily be along an element parallel to its axis, it is simpler to fracture the ring in this fashion. Alternatively, the ring could be fabricated with a split separation, or the ring could be cut along one of its elements. It is further within the contemplation of this invention that the pressure ring may be fractured in more than one place to relieve stress therein.

Therefore, it is an object of this invention to provide a new and improved speed reduction drive.

It is another object of this invention to provide a novel, flexible pressure ring for a harmonic speed reduction drive mechanism.

Other objects will become apparent from the following description when taken in connection with the accompanying FIGURE which is an exploded view of the speed reduction drive of this invention.

In the figure, a pair of wave generators—for example, balls 10 and 12—are held in friction contact with input shaft 14 and split pressure ring 16 by means of guide member 18. Pressure ring 16 is substantially coaxial with shaft 14 but is slightly deformed because of interference between pressure ring 16 and wave generators 10 and 12. A slot 20 in pressure ring 16 splits it to relieve bearing and bending stresses in pressure ring 16. Slot 20 is preferably along an element which is substantially parallel to the axis of pressure ring 16. Alternatively, slot 20 could be a fracture which angles across pressure ring 16. Additional fractures or breaks (not shown) in pressure ring 16 may be desired, further to relieve stress in pressure ring 16.

Due to the interference of wave generators 10 and 12, pressure ring 16 is slightly oval. Pressure ring 16 fits into the interior of flexible cylindrical member 22 and is adapted to transmit pressure to the interior of cylindrical member 22 is response to the position of wave generators 10 and 12.

Cylindrical member 22 is slightly flexible, and has a plurality of teeth 24 uniformly spaced on the outer periphery thereof. Cylindrical member 22 is adapted to nest within member 26 (usually stationary) which forms a cylindrical chamber adapted to receive member 22. On the cylindrical interior of chamber 28 is a plurality of teeth 30 which are uniformly spaced about the periphery thereof and which are adapted to engage teeth 24. Teeth 24 and teeth 30 are not equal in number but differ by a small number—for example, by two.

It is here to be noted that more than two wave generators (such as balls 10 and 12) may be utilized with the drive of this invention in which event the wave generators must be circumferentially symmetrically positioned about the axis of the input shaft. Further, the difference in the number of teeth between teeth 24 and teeth 30 is preferably numerically equal to the number of wave generators present.

In operation, shaft 14 is turned which causes balls or wave generators 10 and 12 to roll over the surface of shaft 14. Balls 10 and 12 also roll over the interior surface of slotted pressure ring 16 to cause guide means 18 to rotate at a substantially smaller angular velocity than the angular velocity of input shaft 14.

It is to be noted that if balls or harmonic generators 10 and 12 are not in frictional contact with shaft 14 but merely roll over pressure ring 16, that support means 18 would have to be fastened to shaft 14 which would cause it to turn at the same angular velocity as shaft 14.

As balls 10 and 12 roll over the interior of pressure ring 16, pressure ring 16 flexes—without excessive internal stress due to the presence of relief slot 20.

The outer periphery of pressure ring 16 bears upon the inner surface of cylindrical member 22 which causes member 22 to flex slightly to thereby engage teeth 24 and teeth 30. If it is assumed that there are two additional teeth—for example, in teeth 30 than there are in teeth 24—when guide means 18 has rotated once, cylinder 22 indexes two teeth. An output shaft, such as shaft 32, conveniently may be connected to cylinder 22. If balls 10 and 12 are frictionally driven by shaft 14, guide means 18 turns at a slower angular velocity than shaft 14.

Speed reductions of the order of 500 to 1 have been observed with a mechanism of this type.

There has thus been provided an improvement in a harmonic drive mechanism—i.e., splitting the pressure ring—to relieve bearing and bending stresses in the pressure ring to thereby cause the drive to have a long-life when the ring is of a small diameter.

It is not intended that the device should be limited by the above description, but only in accordance with the spirit and scope of the following claims.

I claim:

1. In combination: means forming a cylindrical chamber having teeth on the inner surface thereof; means forming a flexible cylindrical member having teeth on the outer periphery thereof engaging said first mentioned teeth, the number of teeth in said first mentioned teeth and said second mentioned teeth differing slightly; a flexible split pressure ring positioned within said second mentioned cylindrical means; at least two harmonic wave generators engaging said pressure ring and wherein said flexible split pressure ring conforms to the shape of said flexible cylindrical member by the rotative action of said harmonic wave generators; and means connected to drive said wave generators.

2. A harmonic drive mechanism comprising: an input shaft; at least two wave generators mechanically connected to engage and be driven by said shaft; a flexible pressure ring, split in at least one portion thereof to relieve bearing and bending stresses therein adapted and positioned to engage said wave generators; a flexible cylindrical member positioned to be engaged by said pressure ring, said pressure ring conforming to the shape of said flexible cylindrical member in response to motion of said wave generators, said cylindrical member having a plurality of teeth uniformly and circumferentially disposed around the outer periphery thereof; means forming a cylindrical chamber having a plurality of teeth on the inner circumference thereof engaging said first mentioned teeth along a portion of said periphery, the teeth of said cylindrical member and said cylindrical chamber differing in number by an amount equal to the number of said wave generators; and means connected to said first mentioned cylindrical member to carry rotational motion therefrom.

3. A harmonic drive mechanism comprising: a plurality of harmonic generators, symmetrically circumferentially disposed to rotate about an axis; a flexible pressure ring adapted and positioned to engage said harmonic generators, said ring being split in at least one portion thereof to relieve bearing and bending stresses therein; first and second cylindrical means forming a first and second cylindrical sets of gear teeth, each said set having a different number of teeth, said difference in number being equal to the number of said harmonic generators, said first set of teeth being on the outer periphery of said first cylindrical means and said second set being on the inner periphery of said second cylindrical means, said first cylindrical means being flexible and adapted to engage said pressure ring wherein said first cylindrical means is deformed in response to motion of said wave generators and thereby engaging a portion of said second cylindrical means and wherein said flexible pressure ring conforms to the shape of said flexible cylindrical member.

4. In combination: a first shaft; a plurality of ball members; guide means for holding said ball members in frictional engagement with said shaft and symmetrically circumferentially disposed around the axis of said shaft; a flexible, substantially circular cylindrical pressure ring having at least one stress relieving slot therein, said pressure ring engaging said ball members on the inner surface of said ring to cause said ring to flex; a flexible right circular cylindrical member engaging by its inner surface the outer surface of said pressure ring, and having a plurality of teeth forming a first set of teeth circumferentially and symmetrically disposed on the outer surface of said cylindrical member; means forming a cylindrical chamber having a plurality of teeth forming a second set of teeth uniformly and symmetrically disposed around the periphery of said chamber and engaging a portion of said first mentioned teeth upon deformation of said flexible right circular cylindrical member in response to the flex of said pressure ring, the number of teeth in each of said two sets of teeth being slightly different, and wherein said flexible pressure ring conforms to the shape of said flexible cylindrical member.

5. A device as recited in claim 4 in which the difference in number between the number of teeth on one of said sets and the number of teeth on the other of said sets is equal in number to said ball members.

6. In combination: a flexible pressure ring, split in at least one portion thereof to relieve bearing and bending stresses therein; and a flexible cylindrical member positioned to be engaged and deformed by said pressure ring and wherein said flexible pressure ring conforms to the shape of said flexible cylindrical member during deformation thereof.

7. The combination of claim 6 and further comprising: at least two wave generators engaging said pressure ring.

8. The combination of claim 7 and further comprising: turning means attached to said wave generators and a plurality of teeth uniformly and circumferentially disposed around the outer periphery of said flexible cylindrical member.

9. In combination: a flexible substantially cylindrical and radially deformable pressure ring, split in at least one portion thereof to relieve bearing and bending stresses therein; and at least two wave generators engaging said pressure ring.

10. An harmonic drive mechanism having in combination a plurality of ball members and a split pressure ring adapted and positioned to engage said ball members and a flexible cylindrical member in peripheral contact with said split pressure ring wherein said flexible cylindrical member is deformed by the rotative action of said ball members, and wherein said pressure ring is flexible and conforms to the shape of said flexible cylindrical member.

11. An harmonic drive mechanism having in combination a turning means, a plurality of ball members circumferentially disposed about said turning means and a flexible pressure ring split at least in one portion thereof to relieve bearing and bending stresses therein adapted and positioned to engage said ball members and a flexible cylindrical member in peripheral contact with said split pressure ring wherein said flexible cylindrical member is deformed by the rotative action of said ball members and wherein said flexible pressure ring conforms to the shape of said flexible cylindrical member.

References Cited in the file of this patent
UNITED STATES PATENTS

| | | |
|---|---|---|
| 771,541 | Ericson | Oct. 4, 1904 |
| 2,106,860 | Tibbetts | Feb. 1, 1938 |
| 2,906,143 | Musser | Sept. 29, 1959 |

OTHER REFERENCES

Harmonic Drive Illustrated Applications, page 3, copyright Nov. 6, 1959. (Copy in Div. 12.)